(12) United States Patent
Arquilliere et al.

(10) Patent No.: US 9,017,448 B2
(45) Date of Patent: Apr. 28, 2015

(54) COMPOSITION FOR THE SYNTHESIS OF BIMETALLIC NANOPARTICLES IN AN IONIC LIQUID AND ASSOCIATED METHOD

(75) Inventors: Philippe Arquilliere, La Chapelle de la Tour (FR); Paul-Henri Haumesser, Saint Cassien (FR); Inga Helgadottir, Lyons (FR); Catherine Santini, Collonges Mont d'Or (FR)

(73) Assignees: Commissariat a l'Energie Atomique et aux Energies Alternatives, Paris (FR); CNRS—Centre National de la Recherche Scientifique, Paris (FR); Universite Claude Bernard Lyon 1, Villeurbanne (FR); CPE Lyon, Villeurbanne (FR)

(*) Notice: Subject to any disclaimer, the term of this patent is extended or adjusted under 35 U.S.C. 154(b) by 79 days.

(21) Appl. No.: 13/451,935

(22) Filed: Apr. 20, 2012

(65) Prior Publication Data
US 2012/0295110 A1    Nov. 22, 2012

(30) Foreign Application Priority Data
May 2, 2011 (FR) ..................... 11 53743

(51) Int. Cl.
*B22F 9/24* (2006.01)
*B22F 1/00* (2006.01)
*B82Y 30/00* (2011.01)

(52) U.S. Cl.
CPC ......... *B22F 1/0018* (2013.01); *B22F 2009/245* (2013.01); *B82Y 30/00* (2013.01)

(58) Field of Classification Search
None
See application file for complete search history.

(56) References Cited

U.S. PATENT DOCUMENTS

| 7,335,245 B2 * | 2/2008 | He et al. ........................ 75/351 |
| 7,758,668 B1 * | 7/2010 | Wu ................................ 75/362 |
| 8,664,147 B2 * | 3/2014 | Bello et al. ................... 502/326 |
| 2010/0191027 A1 * | 7/2010 | Leger et al. .................. 585/276 |
| 2010/0280296 A1 * | 11/2010 | Bisson et al. ............... 585/277 |

OTHER PUBLICATIONS

Arquilliere, P.P. et al., "Synthesis of Copper and Copper-Ruthenium Nanoparticles in Ionic Liquids for Advanced Metallization of Interconnect Structures", 219th Electrochemical Society Meeting, Abstract # 79, May 3, 2011.*

K. Vinodgopal, et al., "Sonochemically Prepared Platinum-Ruthenium Bimetallic Nanoparticles", The Journal of Physical Chemistry B, Letters, vol. 110, No. 9, XP-002664994, 2006, pp. 3849-3852.

Giovanni P. Rachiero, et al., "Bimetallic RuCu and RuCu catalysts supported on $\gamma$-$Al_{2O_3}$. A comparative study of their activity in hydrolysis of ammonia-borane", International Journal of Hydrogen Energy vol. 36, No. 12, XP-002664995, ScienceDirect, Elsevier, 2011, pp. 7051-7065.

Gorka Salas, et al., "Influence of amines on the size control of in situ synthesized ruthenium nanoparticles in imidazolium ionic liquids", Dalton Transactions, This Journal is The Royal Society of Chemistry, vol. 40, No. 17, XP-002664996, 2011, pp. 4660-4668.

French Preliminary Search Report and Written Opinion issued Dec. 6, 2011, in French 1153743, filed May 2, 2011 (with English Translation of Categories of Cited Documents).

* cited by examiner

*Primary Examiner* — George Wyszomierski
(74) *Attorney, Agent, or Firm* — Oblon, McClelland, Maier & Neustadt, L.L.P.

(57) ABSTRACT

The invention relates to a composition for synthesizing bimetallic nanoparticles, wherein the composition contains a first organometallic precursor and a second organometallic precursor having different decomposition rates and contained within an ionic liquid solution. The invention also relates to a method for synthesizing bimetallic nanoparticles, in which the composition is transformed under a hydrogen gas pressure between 0.1 and 10 MPa at a temperature between 0 and 150° C. until a suspension of bimetallic nanoparticles is obtained. The resulting nanoparticles are useful in diverse fields including the fields of catalysis and microelectronics.

4 Claims, No Drawings

COMPOSITION FOR THE SYNTHESIS OF BIMETALLIC NANOPARTICLES IN AN IONIC LIQUID AND ASSOCIATED METHOD

TECHNICAL FIELD

The present invention relates to a composition for synthesizing bimetallic nanoparticles in an ionic liquid and to an associated method.

Nanoparticles are particles having nanometric dimensions.

Nanoparticles may be used in diverse fields and quite particularly in the fields of catalysis and microelectronics.

PRIOR ART

Metallic nanoparticles formed from a single metal have been known for many years. These monometallic nanoparticles have properties different from the properties of the metal from which they are produced. This is due especially to their relatively extensive surface-to-volume ratio. The synthesis of monometallic nanoparticles was developed to permit control of the size and an efficient stabilization, thus preventing agglomeration of the nanoparticles.

Bimetallic nanoparticles appeared later and are increasingly gaining importance compared with monometallic nanoparticles by virtue of their new properties. The properties of bimetallic nanoparticles result not only from the combination of the properties of the two metals but also from synergy. The bimetallic nanoparticles have a surface structure that depends on the composition and on the atomic segregation.

Nevertheless, the preparation of these bimetallic nanoparticles is much more complex than that of monometallic nanoparticles. Control of the size, morphology, composition, structure or even stability is essential to obtain nanoparticles having advantageous properties, but it necessitates special methods.

The synthesis of bimetallic nanoparticles is achieved in the solid state by mechanical processing, in the gaseous state by vapor-phase deposition or in the solution state by chemical processing, The solid-state methods necessitate very high temperatures to melt the two types of metal. In the gaseous state, the methods use complex apparatus and the quantities produced are still very limited. The methods of preparation in solution are clearly less costly in terms of equipment and time.

Methods for synthesis of bimetallic nanoparticles in solution have already been described. However, none makes it possible to obtain particles that have satisfactory size and are also stable.

DESCRIPTION OF THE INVENTION

For this purpose the present invention proposes a method for synthesizing bimetallic nanoparticles as well as an associated composition.

The invention permits the synthesis of bimetallic nanoparticles from at least two organometallic precursors, OM1 and OM2, in an ionic liquid solution. The two organometallic precursors OM1 and OM2 are chosen such that they have different decomposition rates. The ionic liquid solution comprising the two organometallic precursors is subjected to a step of transformation under hydrogen gas pressure, at a temperature between 0° C. and 150° C. depending on the nature of the ionic liquid and of the organometallic precursors.

The Applicant has surprisingly observed that control of the size of the nanoparticles is achieved as a function of the choice of the organometallic precursors and as a function of their decomposition rate.

An ionic liquid is a salt or a mixture of salts composed of an organic cation associated with an organic or inorganic anion. The ionic liquid is traditionally chosen to be liquid at room temperature. Most of these compounds possess three-dimensional structuring in the form of an ionic lattice, which isolates apolar pockets resulting from the segregation of organic groups carried by the cation. The ionic liquid therefore serves as matrix for the synthesis of the bimetallic nanoparticles and plays an essential role in control of the size of the nanoparticles. Advantageously, the ionic liquids also make it possible to obtain metallic nanoparticles without parasitic species at the surface.

Advantageously, the association of an ionic liquid with at least two organometallic precursors, OM1 and OM2, permits the synthesis of bimetallic nanoparticles whose size and surface structure are controlled. According to the invention, the surface of the obtained bimetallic nanoparticles is bare, meaning that it is composed solely of metal atoms. The bimetallic nanoparticles do not comprise impurities associated with stabilizers that may be involved or with organic parts of precursors or of the ionic liquid.

Other advantages will become apparent in the course of the description of the invention hereinafter.

Firstly it is appropriate to recall that the invention relates to a composition for synthesizing bimetallic nanoparticles, characterized in that it comprises a first organometallic precursor and a second organometallic precursor and an ionic liquid solution containing the said first and second precursors, the first and second organometallic precursors being chosen such that they have different decomposition rates.

According to preferred but non-limitative variants of the invention, the composition is such that:
  a ratio of the rates is at least equal to 2,
  it does not comprise a stabilizer,
  it is composed of a first organometallic precursor and a second organometallic precursor and of an ionic liquid solution containing the first and second precursors,
  the first organometallic precursor and the second organometallic precursor are different and comprise a metal chosen from among: ruthenium (Ru), tantalum (Ta), copper (Cu), nickel (Ni), manganese (Mn), platinum (Pt),
  the quantity of the second organometallic precursor is between 0.5 and 5% of the quantity of the first organometallic precursor,
  the ionic liquid is chosen from among $(C_1C_4ImNTf_2)$, $(C_1C_6ImNTf_2)$ or $(C_1C_8ImNTf_2)$,
  the ionic liquid is pure.

Another object of the invention is a method for synthesizing bimetallic nanoparticles, characterized by the fact that it comprises a step of transformation, under hydrogen gas pressure, of a composition for synthesizing bimetallic nanoparticles comprising a first organometallic precursor and a second organometallic precursor and an ionic liquid solution containing the said first and second precursors, the first and second organometallic precursors being chosen such that they have different decomposition rates.

Advantageously, the transformation step is carried out at a temperature between 0 and 150° C., more preferably on the order of 100°.

Additionally or alternatively, the transformation step is carried out under hydrogen gas pressure between 0.1 and 10 MPa, preferably on the order of 0.9 MPa.

The duration of the transformation step is between 0.5 and 72 hours, for example on the order of 4 hours, until a suspension of bimetallic nanoparticles is obtained.

Advantageously, the transformation step comprises the decomposition of the first organometallic precursor to metallic atoms then the reduction of the metallic atoms to form nuclei and the decomposition of the second organometallic precursor at the surface of the said nuclei.

Another object of the invention is a suspension of bimetallic nanoparticles obtained according to the method described hereinabove, wherein the synthesized bimetallic nanoparticles are ruthenium-tantalum or ruthenium-copper or ruthenium-platinum or nickel-copper or manganese-copper.

Advantageously the size of the bimetallic nanoparticles is between 2 and 5 nm.

Advantageously, the bimetallic nanoparticles have a core-shell structure.

Advantageously, the bimetallic nanoparticles are free of surface contamination.

DETAILED DESCRIPTION OF PARTICULAR EMBODIMENTS

According to the invention, bimetallic nanoparticles are synthesized by solubilizing two organometallic precursors, OM1 and OM2, in an ionic liquid. The whole is placed under hydrogen gas pressure until the formation of the nanoparticles.

Firstly, an ionic liquid possesses low volatility and very low vapor pressure compared with volatile organic solvents or with aqueous solvents. The ionic liquids can therefore be used at much higher temperatures and much lower pressures than the volatile organic solvents.

Advantageously, the ionic liquid according to the invention is liquid at room temperature or has a melting point lower than or equal to 100° C.

The ionic liquids are more particularly advantageous for synthesizing bimetallic nanoparticles, because their three-dimensional structure forms a matrix or a guide for the growth of the bimetallic nanoparticles. In addition, this matrix or this guide also plays a role of stabilization of the synthesized nanoparticles.

The bimetallic nanoparticle suspension obtained by the method according to the invention is capable of being used to deposit the bimetallic nanoparticles on technological substrates. There is no need to separate the nanoparticles from the ionic liquid. The suspension obtained from the method according to the invention can be used directly.

The method according to the invention is based on the decomposition of organometallic precursors by hydrogen gas.

The reaction taking place during the transformation step of the synthesis method according to the invention firstly comprises the decomposition of a first organometallic precursor OM1 into metallic atoms and hydrocarbon by the action of the hydrogen gas. This reduction of the organometallic precursor OM1 leads to the formation of metal nuclei. The nuclei are metal particles with sizes between 1 and 3 nm.

The second organometallic precursor OM2 will then be decomposed at the surface of the nuclei of the first metal. Surprisingly, it has been observed that the reaction of the second organometallic precursor OM2 at the surface of the nuclei of the first metal limits the growth of the nuclei, thus leading to bimetallic nanoparticles of controlled sizes. The bimetallic nanoparticles synthesized by the method according to the invention have a size on the order of 2 to 5 nm. To obtain such a size for bimetallic nanoparticles is particularly advantageous, while under the same reaction conditions the synthesized monometallic nanoparticles have quite larger size, on the order of 6 to 8 nm. The synthesis of monometallic nanoparticles to obtain sizes smaller than 5 nm must be carried out under conditions that are much less favorable in terms of costs, duration or temperature.

This method according to the invention is possible due to the choice of the organometallic precursors. In fact, it is important that the two organometallic precursors have different decomposition rates. In this way, the organometallic precursor OM1, with the faster decomposition rate, will decompose first to form nuclei. The metal of this first organometallic precursor OM1 is situated at the core of the nanoparticle. The second organometallic precursor OM2, with the slower decomposition rate, reacts on the surface of the nuclei. The metal of the second organometallic precursor OM2 forms a shell of the nanoparticle.

The structure of the obtained bimetallic particles is of the core-shell type.

According to one possibility, the second organometallic precursor OM2 may begin to decompose while the first organometallic precursor OM1 has decomposed only partly.

It is understood that the first organometallic precursor OM1 is that with the faster decomposition rate and the second organometallic precursor OM2 is that with the slower decomposition rate.

By decomposition rate there is understood the time that an organometallic precursor needs to decompose into a metallic atom and hydrocarbon in an ionic liquid under pressure of hydrogen gas. The rate of decomposition of an organometallic precursor may be measured by the reactivity of an organometallic precursor during the formation of nanoparticles.

Advantageously, the time for decomposition of OM1 (tau OM1) is at most equal to half the time for decomposition of OM2 (tau OM2). A rate ratio larger than or equal to 2 (tau OM2/tau OM1$\geq$2) is preferred. For example, a ratio on the order of 10 is possible. These decomposition rates are adjustable by modification of the reaction conditions: nature of the ionic liquid, nature of the ligand associated with the organometallic precursor, oxidation state of the metal in the organometallic precursor, temperature and pressure of hydrogen gas.

The quantities of the first and second organometallic precursor are variable as a function of the final composition desired for the bimetallic nanoparticles. Preferably, the quantity of the second organometallic precursor OM2 is less than 85% of the quantity of the first organometallic precursor OM1. Control of the size of the synthesized bimetallic nanoparticles is effective up to this proportion. Beyond it, the size of the bimetallic nanoparticles is no longer satisfactory. Advantageously, the first organometallic precursor OM1 is in excess while the second organometallic precursor OM2 is limiting. More precisely, the second organometallic precursor OM2 is largely a minority component. The limitative effect that the second organometallic precursor OM2 has on the size is observed for quantities of the second organometallic precursor OM2 smaller than 5%, preferably between 0.5 and 1%. This has a certain advantage in terms of cost, since the quantity of metal used is reduced.

In addition, the bimetallic particles synthesized by the present method are stable. Surprisingly, the combination of the effects of the ionic liquid, forming a matrix limiting the growth and agglomeration of the nanoparticles, with the limiting quantity of the second organometallic precursor, blocking the growth of the nanoparticles and then preventing their coalescence, makes it possible to avoid the addition of stabilizers. The absence of stabilizer in the ionic liquid solution for synthesizing bimetallic nanoparticles according to the invention makes it possible to obtain bimetallic nanoparticles free of any surface contamination. They may be usable directly in the ionic liquid suspension.

According to the invention, the purity of the ionic liquid is important. Advantageously, the ionic liquid is pure. By pure it is understood that the ionic liquid has a high degree of purity, containing at most 12 ppm water and 200 ppm halide ions, especially chloride ions. The impurities of the ionic liquid may be of different kinds: starting organic salts, volatile compounds, water, alkali cations, halide ions. The impurities of ionic liquids are responsible for a surface of contaminated bimetallic nanoparticles.

Advantageously, the composition according to the invention does not comprise organic solvent, customarily used to solubilize the organometallic precursors. This contributes to the production of bare bimetallic nanoparticles.

According to the invention, the ionic liquid is chosen from among 1-butyl-3-methylimidazolium bis(trifluoromethylsulfonyl)imide ($C_1C_4ImNTf_2$), 1-hexyl-3-methylimidazolium bis(trifluoromethylsulfonyl)imide ($C_1C_6ImNTf_2$) or 1-octyl-3-methylimidazolium bis(trifluoromethylsulfonyl)imide ($C_1C_8ImNTf_2$).

The organometallic precursors comprise preferably transition metals, for example ruthenium (Ru), tantalum (Ta), copper (Cu), nickel (Ni), manganese (Mn), platinum (Pt).

By way of example, the formed bimetallic nanoparticles may comprise the following metal pairs: ruthenium-tantalum or ruthenium-copper or ruthenium-platinum or nickel-copper or manganese-copper.

In the foregoing, the organometallic precursor with the faster decomposition rate is mentioned first.

EXAMPLES

Synthesis of Bimetallic Nanoparticles According to the Invention:

A first organometallic precursor of ruthenium—RuCODCOT—and a second organometallic precursor of copper—mesitylCu—are solubilized in an ionic liquid—($C_1C_4ImNTf_2$)—in variable proportions. The total concentration is $5 \times 10^{-2}$ M. The solution is heated to 100° C. under 0.9 MPa of hydrogen gas for 4 hours. The two organometallic precursors are reduced to metal while becoming organized in the form of bimetallic nanoparticles. The bimetallic nanoparticles are observed by transmission electron microscopy (TEM in English) to determine the size distribution, by electron energy loss spectroscopy (EELS in English) and by X-ray photon spectroscopy (XPS in English).

Under these synthesis conditions, ruthenium alone and copper alone lead respectively to nanoparticles of 6+/−4 and 5+/−1 nm. When both elements are present simultaneously, the size of the bimetallic nanoparticles drops to 2-3 nm, In the EELS image, when the copper has not yet decomposed, only the ruthenium is visible. Once the copper starts to decompose, the copper becomes visible and the visualized objects are larger, thus clearly indicating that the copper is situated at the periphery of the nanoparticles in the course of formation.

Measurement of the Rate of Decomposition of an Organometallic Precursor:

According to one possibility, the rate may be determined by visual observation. In fact, the solution becomes progressively black during the formation of nanoparticles.

An organometallic precursor is solubilized in an ionic liquid and a step of transformation according to the invention is carried out. The rate of decomposition of the organometallic precursor may be determined by observing the color of the solution.

For example, RuCODCOT is solubilized in $C_1C_4ImNTf_2$ ionic liquid. This solution is subjected to a step of transformation, meaning at 100° C. under a pressure on the order of 0.4 MPa. Visual observations are made by camera or photography, for example. It has been able to be determined that the decomposition of the organometallic precursor and therefore the formation of ruthenium nanoparticles was achieved in approximately 30 minutes.

The same method is used to measure the rate of decomposition of the mesitylCu organometallic precursor. With this organometallic precursor, it has been able to be determined that the decomposition of the organometallic precursor and therefore the formation of copper nanoparticles was achieved after approximately 6 hours.

The rate ratio (tauOM2/tauOM1) is therefore on the order of 12 for this pair of organometallic precursors.

According to another possibility, the rate of decomposition of an organometallic precursor may also be measured by observing the concentration of hydrocarbons present in the reaction mixture.

An organometallic precursor is solubilized in an ionic liquid and subjected to a step of transformation. At different times, the reaction is stopped and the reaction medium is analyzed. The reaction medium is placed under vacuum to degas the compounds. The volatile compounds are condensed then analyzed by gas-phase chromatography.

The greater the quantity of hydrocarbons present in the mixture, the further the decomposition of the organometallic precursor has advanced.

The invention claimed is:

1. A method for synthesizing a bimetallic nanoparticle, comprising transforming, under hydrogen gas pressure, a composition consisting of a first organometallic precursor, a second organometallic precursor and an ionic liquid solution comprising the first and second precursors, wherein the first and second organometallic precursors have different decomposition rates, at a temperature between 0 and 150° C. and under a hydrogen gas pressure between 0.1 and 10 MPa for a time between 0.5 and 72 hours until a suspension of bimetallic nanoparticles is obtained.

2. The method according to claim 1, wherein a duration of the transforming is 4 hours.

3. The method according to claim 1, wherein the transforming is carried out at a temperature of from 100 to 150° C.

4. The method according to claim 1, wherein the hydrogen gas pressure is from 0.4 to 0.9 MPa.

* * * * *